United States Patent
Chuaprasert et al.

(10) Patent No.: US 9,712,527 B2
(45) Date of Patent: *Jul. 18, 2017

(54) RANGE BASED USER IDENTIFICATION AND PROFILE DETERMINATION

(71) Applicant: Intel Corporation, Santa Clara, CA (US)

(72) Inventors: Michelle H. Chuaprasert, Portland, OR (US); David M. Durham, Beaverton, OR (US); Mark D. Boucher, Portland, OR (US); Sanjay Bakshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,399

(22) Filed: May 13, 2016

(65) Prior Publication Data

US 2016/0269406 A1 Sep. 15, 2016

Related U.S. Application Data

(63) Continuation of application No. 13/995,507, filed as application No. PCT/US2011/068039 on Dec. 30, 2011, now Pat. No. 9,348,990.

(51) Int. Cl.
*G06F 21/00* (2013.01)
*H04L 29/06* (2006.01)
(Continued)

(52) U.S. Cl.
CPC .......... *H04L 63/0876* (2013.01); *G06F 21/35* (2013.01); *G06Q 10/10* (2013.01); *G06Q 30/02* (2013.01); *H04L 67/306* (2013.01)

(58) Field of Classification Search
CPC combination set(s) only.
See application file for complete search history.

(56) References Cited

U.S. PATENT DOCUMENTS

2003/0114104 A1 6/2003 Want et al.
2004/0128389 A1 7/2004 Kopchik
(Continued)

FOREIGN PATENT DOCUMENTS

KR 10-2007-0030355 3/2007
KR 10-2011-0096011 8/2011

OTHER PUBLICATIONS

European Patent Office, Extended European Search Report mailed Jul. 29, 2015, in European Patent Application No. 11878617.7.
(Continued)

*Primary Examiner* — Ghazal Shehni
(74) *Attorney, Agent, or Firm* — Trop, Pruner & Hu, P.C.

(57) ABSTRACT

An embodiment includes a main compute node that detects the physical presence of a first user and subsequently loads a profile for the first user. The main compute node may detect the first user's presence based on detecting a first compute node corresponding to the first user. For example, the main compute node may be a desktop computer that detects the presence of the first user's Smart phone, which is nearby the first user. The main compute node may unload the first user's profile when the main compute node no longer detects the first user's presence. Upon detecting a second user's presence, the main computer may load a profile for the second user. The profile may include cookies and/or other identifiers for the second user. The profile may facilitate the second user's navigation of a computing environment (e.g. web pages). Other embodiments are addressed herein.

20 Claims, 4 Drawing Sheets (51) Int. Cl.
  *G06Q 30/02*  (2012.01)
  *G06Q 10/10*  (2012.01)
  *G06F 21/35*  (2013.01)
  *H04L 29/08*  (2006.01)

(56) References Cited

U.S. PATENT DOCUMENTS

| | | |
|---|---|---|
| 2004/0203363 A1 | 10/2004 | Carlton |
| 2006/0214773 A1 | 9/2006 | Wagner |
| 2008/0256536 A1 | 10/2008 | Zhao |
| 2009/0181653 A1* | 7/2009 | Alharayeri .............. H04W 4/02 455/414.1 |
| 2010/0010864 A1* | 1/2010 | Lee .................... G06Q 10/1093 705/7.18 |
| 2011/0047242 A1 | 2/2011 | Sinha |
| 2011/0096011 A1 | 4/2011 | Suzuki |
| 2011/0276408 A1 | 11/2011 | Toole |
| 2011/0302297 A1 | 12/2011 | Kruglick |

OTHER PUBLICATIONS

International Searching Authority, "Notification of Transmittal of the International Search Report and the Written Opinion of the International Searching Authority," mailed Sep. 27, 2012, in International application No. PCT/US2011/068039.

Taiwan Patent Office, "Taiwan Office Action and IPO Search Report," Aug. 25, 2014, in Taiwan application No. 101150131.

Taiwan Patent Office, "Taiwan Office Action and IPO Search Report," Dec. 23, 2014, in Taiwan application No. 101150131.

\* cited by examiner

RANGE BASED USER IDENTIFICATION AND PROFILE DETERMINATION

This application is a continuation of U.S. patent application Ser. No. 13/995,507, filed Jun. 19, 2013, which is a §371 National Stage Entry of International Application No. PCT/US2011/068039, filed Dec. 30, 2011. The content of each of the above applications is hereby incorporated by reference.

BACKGROUND

In certain situations a single compute node may be shared by multiple users. For example, in the home environment a family may share a single personal computer, notebook computer, tablet computer, and the like. Each user in the family may have a unique profile for the shared computer. That unique profile may include, for example, various cookies that facilitate a user easily logging on to websites. Thus, there may be various profiles with each profile having its own cookies.

This shared compute node scenario can present complications. For example, a father may log into the shared compute node, load his profile, and visit an on-line retailer. Upon doing so, the on-line retailer may recognize cookies associated with the father's loaded profile and automatically load billing information, such as a credit card number and password, based on the recognized cookies. The father may then walk away from the shared compute node. A child may subsequently visit the shared node, which is still logged into the father's profile. The child may then, maliciously or innocently, order merchandise from the on-line retailer using the father's billing information. Of course various other scenarios exist where an unmonitored user profile may provide unintended access to services ranging from email accounts to social media accounts, all of which present concerns if accessed by someone other than the proper user associated with the loaded profile.

These issues may only worsen as the "compute continuum" advances. A compute continuum provides a consistent client-aware connected environment for a user across varying computing devices. A compute continuum may allow a user to watch a movie on a first compute node (e.g., tablet computer), stop watching the movie at chapter X of the movie, and then resume watching the movie at location X from a second compute node (e.g., desktop computer). In doing so, the user may move seamlessly from one compute node to another computer node. With this fluid migration among nodes, the possibility of user profile misuse will be heightened. For example, a user migrating from a first node to a second node may forget to logout (e.g., unload) his profile from the first node, leaving that profile exposed to subsequent users that visit the first node.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment includes a main compute node that detects the physical presence of a first user and subsequently loads a profile for the first user. The main compute node may detect the first user's presence based on detecting a first compute node corresponding to the first user. For example, a desktop computer (main compute node) detects the presence of the first user's Smart phone (first compute node), which is nearby the first user (e.g., in the user's pocket or purse). The main compute node may unload the first user's profile when the main compute node no longer detects the first user's presence. Upon detecting a second user's presence based on, for example, a second user holding a second Smartphone (second compute node), the main compute node may load a profile for the second user. The second user profile may include cookies and/or other identifiers for the second user. The second user profile may facilitate the second user's navigation of a computing environment, which may include web pages, user interfaces that require passwords, and the like. For example, the cookies included in the second user profile may help navigate various web pages. Other embodiments are addressed herein.

Figure 1:
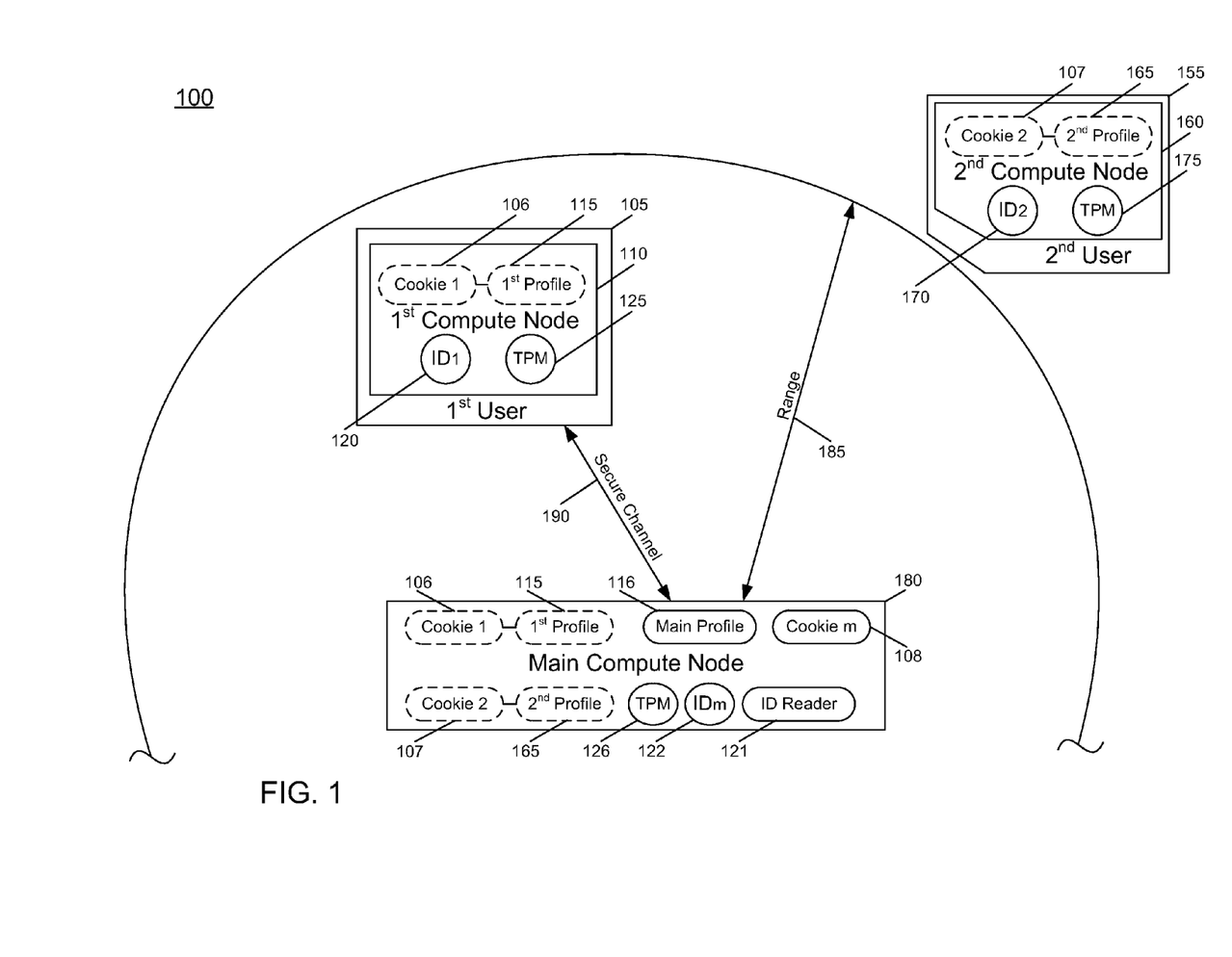
FIG. 1 includes a block diagram for a system including compute nodes in an embodiment of the invention.

FIG. 1 includes a block diagram for system 100 including compute nodes in an embodiment of the invention. Main compute node 180 may communicate with first compute node 110 and/or second compute node 160. Compute nodes 110, 160, 180 may include any of various computing node types including desktops, tablets, notebooks, Smart phones, personal digital assistants (PDAs), and the like. Main compute node 180 may participate in near field communications (NFC) with nodes 110, 160 if those nodes are within a certain physical range, such as the range defined by radius 185. In FIG. 1, first compute node 110 is located "in" range 185 and second compute node 160 is located "outside" range 185.

Figure 2:
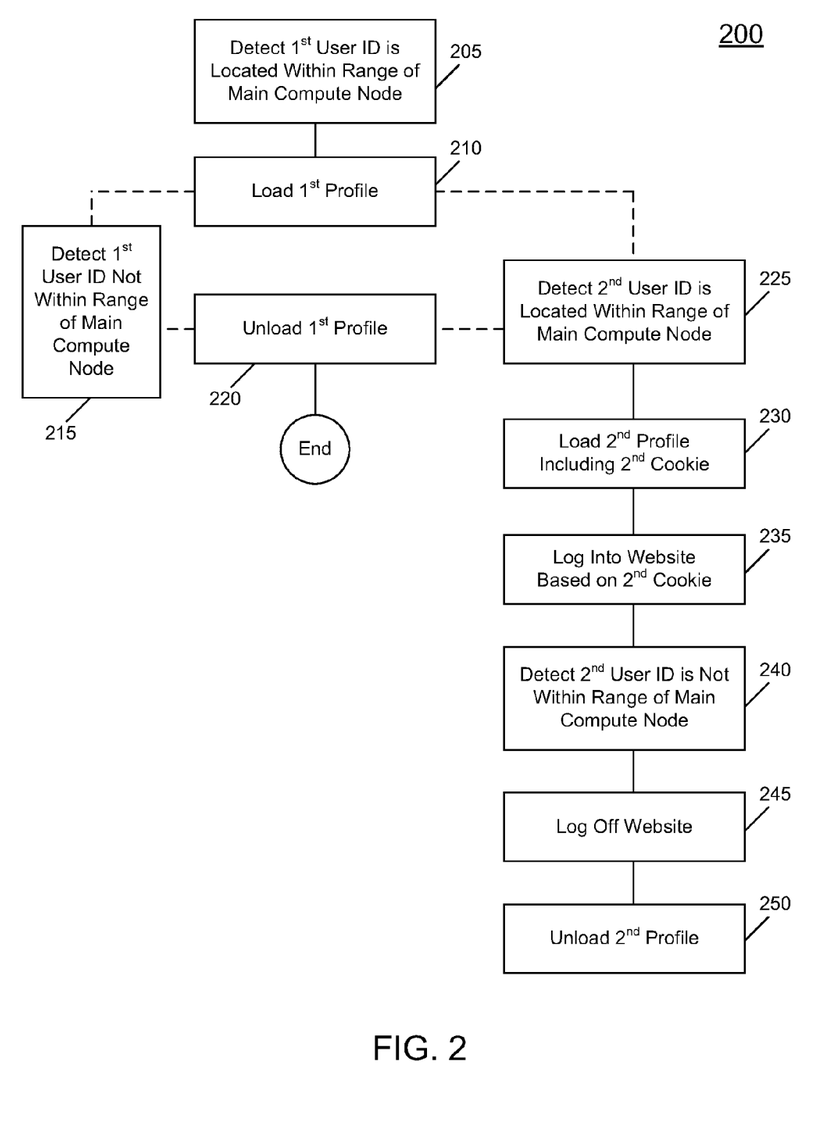
FIG. 2 includes a flow chart for various processes in embodiments of the invention.

This basic interaction between computing nodes 110, 160, 180 is discussed in light of FIG. 2, which includes a flow chart for various processes in embodiments of the invention.

In process 200, block 205 includes main compute node 180 detecting first user identifier (ID1) 120 is located within range 185 of main compute node 180. ID1 120 may correspond to first compute node 110 (e.g., ID1 120 may be a radio-frequency identification (RFID) tag included in or coupled to node 110). This proximity detection may be performed in various ways. For example, proximity of first compute node 110 ID1 120 to node 180 may be based on NFC technology. NFC capabilities may pertain to standards for establishing radio communications between computing nodes (e.g., between nodes 110 and 180) by touching the nodes together, bringing the nodes within a range of each other, and the like. Detection range 185 may extend 0.25, 0.50. 75, 1.0, 1.25, 1.5, 1.75, 2.0 meters and the like. NFC allows for data exchange between compute nodes and offers a simplified communication protocol. However, embodiments are not limited to NFC protocols and may use other proximity and detection protocols such as, for example, Wi-Fi, Bluetooth, RFID protocols and standards (e.g., ISO/IEC 14443, ISO/IEC 18092), and the like.

Regarding RFID in particular, RFID may use radio waves to transfer data from an electronic tag, called an RFID tag or label included in or coupled to any of nodes 110, 160, 180, to reader 121 for the purpose of identifying and tracking a node, such as node 110. ID1 120, ID2 170, and IDm 126 may each be identifiers included in corresponding RFID tags. RFID tags 120, 170, 126 can be read from several meters away and beyond the line of sight of reader 121. Bulk reading enables two or more tags to be read almost simultaneously. An RFID tag's information may be stored electronically. The RFID tag may include a small radio frequency (RF) transmitter and receiver. RFID reader 121, possibly included in main compute node 180 (but possibly also located in node 110 and/or node 160), may transmit an encoded radio signal to interrogate RFID tags included in nodes 110, 160. The tags receive the message and respond with their corresponding identification information, such as ID1 120 and ID2 170. Reader 121 may cast a specific interrogation zone defined by radius 185 to create a zone of RF energy defining an interrogation zone to interact with IDs 120, 170. RFID tags 120, 170 may not need to use a battery (i.e., may be passive tags). Instead, the tags may use the radio energy transmitted by reader 121 as an energy source.

In some embodiments, any of nodes 110, 160, 180 may include RFID tags and RFID readers such that each node may function as the "main compute node" as described above. For example, different labels are applied to nodes 110 ("first compute node"), 160 ("second compute node"), 180 ("main compute node") but those labels are used for discussion purposes and each of nodes 110, 160, 180 may include the same hardware and software and otherwise be equivalent devices. For example, nodes 110, 160, 180 may each include an ID (120, 170, 122), profile (115, 165, 116), trusted platform module (TPM) (125, 175, 126), cookies (106, 107, 108), and the like. The use of IDs, profiles, TPMs, and cookies are discussed further below.

Returning to FIG. 2, in block 210 main compute node 180 may, after detecting ID1 120 is within range 185, load first profile 115. First profile 115 may be stored in memory included in first compute node 110. Such memory may include non-volatile memory included generally in node 115. However, first profile 115 may specifically be included in a tag, which may include ID1 120. For example, in an embodiment first profile 115 may be included in a tag (e.g., NFC or RFID tags) that securely stores data within the profile. Such profile data may associate the tag (which may include IDs 120, 170) respectively with users 105, 155 based on debit/credit card information, personal identification numbers (PIN) including passwords used to access secure systems, among other information such as cookies 106, 107 and the like (discussed further below). The tags may provide different communication speeds and capabilities in terms of configurability, memory (e.g., 1 k, 2 k, 3 k, 4 k, 5 k bytes of memory), security, and data retention. Thus, in an embodiment a tag (e.g., RFID tag) may include identifying information (e.g., ID1 120, which may be a unique ID for node 110), a profile (e.g., first profile 115, which may include data such as billing information, cookie1 106, and the like). ID1 120 and first profile 115 may be different data stored in a single data container in some embodiments.

In an embodiment, first profile 115 may be included in TPM 125. TPM 125 (as well as TPMs 175, 126) includes a secure cryptoprocessor that can store cryptographic keys that protect information. TPM 125 may comply with the Trusted Computing Group TPM specification, such as TPM specification 1.2 Revision 116. TPM 125 may offer facilities for the secure generation of cryptographic keys, and limitation of their use, in addition to a hardware pseudo-random number generator. It also may include capabilities such as remote attestation and sealed storage. TPM 125 may assure the integrity of first profile 115 and more generally, node 110. This may entail attesting the power-on boot process of node 110 began from a trusted condition and extends this trust until basic input/output system (BIOS) and operating system (OS) of node 110 have fully booted and applications are running. Further, TPM 125 may securely store first profile 115 and images of the same. TPM 125 may contain several Platform Configuration Registers (PCRs) that allow secure storage and reporting of data (e.g., first profile 115) and security relevant metrics. These metrics can be used to detect changes to previous.

In an embodiment, first profile 115 may be stored on main compute node 180. Further, first profile 115 may be stored in TPM 126 of main compute node 180. Main compute node 180 may include profiles from various nodes, such as nodes 110, 160. Thus, the following discussion regarding cookies works from the perspective that first profile 115 is stored in main compute node 180. However, this is not limiting and is used only for ease of discussion. For example, first profile 115 (and cookie1 106) may instead be stored in node 110 and second profile 165 (and cookie2 107) may instead be stored in node 160. Hence dashed lines are used to show the variable options for storing elements 115, 106, 165, 107. Depending on where cookies and/or profiles are stored, cookies and profiles may be exchanged between nodes, such as nodes 110 and 180, via secure channel 190, which may be based on keys included in TPMs 125, 126

Regardless, the following discussion works from the perspective that profile 115 is stored in node 180. First profile 115 may include at least one cookie (cookie1 106). A cookie, such as cookies 106, 107, 108, may be a form of data container for transmitting a packet of data. The cookie may be used by a website to send data, such as state information, to a node browser such as a browser for main compute node 180. The browser for compute node 180 may return data, such as state information, to the website. State information included in cookie1 106 may be used for identification of user 105's session, user 105's preferences (e.g., user interface preferences, billing information, shipping information, and the like), shopping cart contents for user 105, and the like. To help prevent cookie misappropriation (e.g., a cookie being stolen by a malicious third party to gain access to user 105's web account), first profile 115 and cookie1 106 may be stored in secure storage such as TPM 126.

Cookie1 106 of first profile 115 may be a session cookie that only lasts for the duration of a user' visit to a website. However, cookie1 106 may instead be a persistent cookie that will last multiple user 105 sessions. Cookie1 106 may be a secure cookie used when a browser of node 180 visits a server via Hypertext Transfer Protocol Secure (HTTPS), ensuring that cookie1 106 is always encrypted when transmitting from node 180 to a server hosting a website. Cookie1 106 may be an HttpOnly cookie used only when transmitting Hypertext Transfer Protocol (HTTP) (or HTTPS) requests. Cookie1 106 may be set with the same domain (or its subdomain) as the target website being visited by the user. However, cookie 106 may instead be set with a different domain from the target website.

Cookie1 106 may be used to maintain data related to user 105 during navigation, possibly across multiple visits. Cookie1 106 may be used to implement a "shopping cart" which can be used to, for example, store items a user want to purchase from an on-line retailer web site. The web server for the on-line retailer may send a cookie (including cookie1 106 or separate and apart from cookie1 106) containing a unique session identifier. The web browser for node 180 may then send that session identifier to the on-line retailer web server with each subsequent request so the shopping basket items are stored and associated with the unique session identifier.

Regarding the loading of first profile 115 (whether profile 115 is loaded from node 105, 155, or 180), the profile may be loaded in several ways. For example, based on detection of ID1 120 associated with user 105, an agent program running in the OS of main compute node 180 may access first profile 115, and consequently cookie1 106 as well as other information such as user 105's temporary internet files, and internet history. Thus, the agent may associate cookies with a compute context defined by the detected node (e.g., detection of ID1 120).

In block 215, main compute node 180 detects ID1 120 is no longer within range 185. In block 220, the agent application may then, for example, package the cookie, temporary internet files, and internet history into a compressed file, encrypt the compressed file with a password attributed to user 105, and store the encrypted file in memory and/or TPM 126. The process may be reversed when loading a profile such as profile 115, as called for in block 210. If no ID is detected, the process may end until another ID is eventually detected.

Dashed lines are shown between blocks 210, 215 and 220 to show this path is one option in one embodiment. Another path option is shown in dashed lines between blocks 201, 225, 220. Some embodiments include all paths between blocks 210, 215, 220 and blocks 201, 225, 220.

In block 225 user ID2 170, associated with second user 155, is determined by main compute node 180 to be within range 185. Block 230 loads second profile 165, and possibly cookie2 107 if the cookie is included in or coupled to second profile 165. This profile loading may occur as described above in regards to block 210 for first profile 115.

In block 235, based on second profile 165 and possibly cookie2 107 (or other identification data), main compute node 180 may not only load cookie2 107 but may also log into a webpage based on second profile 165 and possibly cookie2 107. However, the process of logging into a webpage is optional and may not be included in all embodiments.

The flow chart of FIG. 2 has components that may be removed or rearranged to form other embodiments. For example, block 235 may be omitted in an embodiment. In other embodiments blocks 220 and 250 may be omitted. Blocks 235, 220, and 250 may be omitted. Block 245 may be omitted in some embodiments. Also, blocks 215 and 240 are optional.

Then, as was the case in block 215, in block 240 main compute node 180 may detect ID2 170 is no longer within range 185 and may then log off the website (block 245) and/or unload second profile 165 (block 250).

Figure 3:
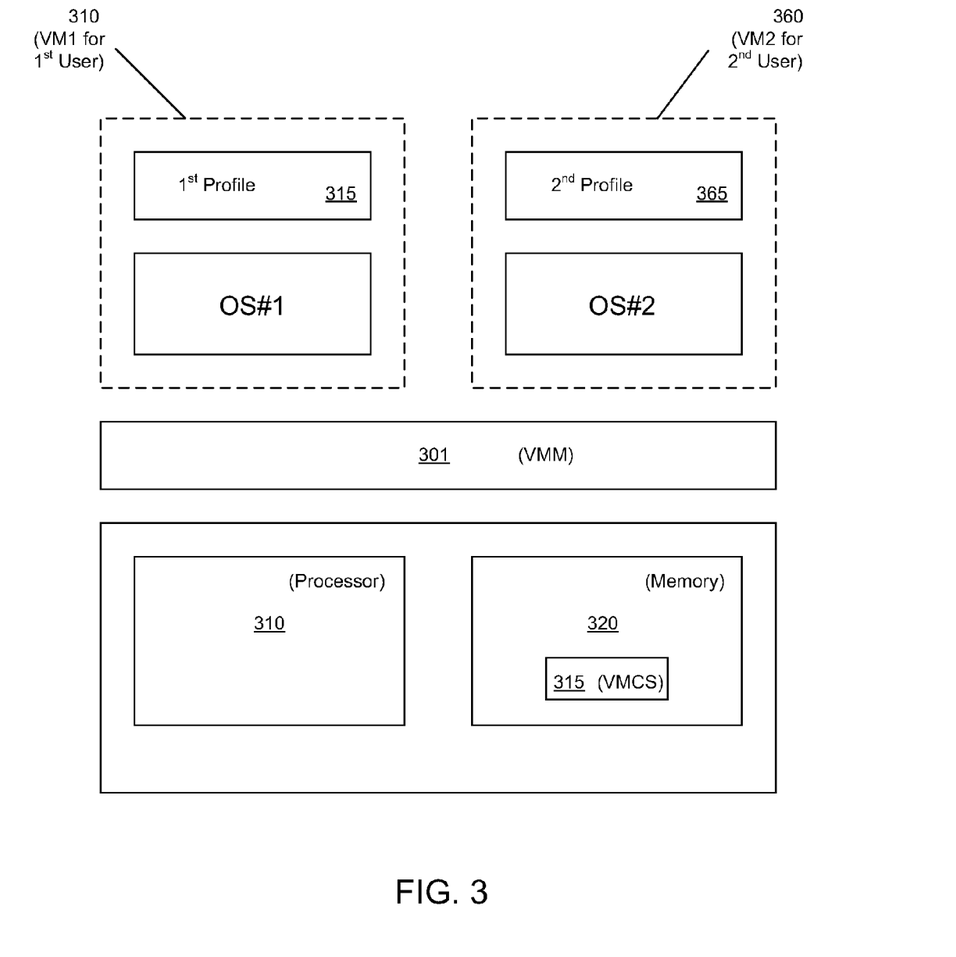
FIG. 3 includes a virtualized environment in an embodiment of the invention.

User profiles may be loaded or changed differently in other embodiments. For example, in one embodiment main compute node 180 may host virtual machines (VM) respectively assigned first user 105 and second user 155. FIG. 3 illustrates a structure ("virtual machine environment") for interfacing guest software to a microprocessor. Virtual machine manager (VMM) 301 interfaces VMs 310, 360 ("guest software") to microprocessor 310. The software running within each VM may include a guest OS as well as various software applications and first profile 315 and second profile 365. In order to interface each of VMs 310, 360 to processor resources, such as registers, memory, and input/output ("I/O") resources, state and control information is modified and otherwise tracked via a set of fields within a virtual machine control structure (VMCS) 315, which may reside in memory 120. More specifically, a control structure, such as the VMCS, may be used to pass control of and access to processor resources between the VMM and a VM guest. VMCS 315 is not required in all embodiments. In an embodiment, detection of ID1 120 leaving range 185 and ID2 170 entering range 185 may cause VMM 301 to switch from VM1 310 to VM2 360 and consequently from first profile 315 to second profile 365, thereby restoring content, documents, and/or web pages associated with second user 155, who is associated with second profile 365.

Thus, in some embodiments an agent program (e.g., a Microsoft Windows service) may detect the presence of a device, identify that device, and by association, identify a user. The devices are varied and include, for example without limitation, mobile phones, an RFID tag on a key chain, a key fob based on NFC or RFID communications protocols, a credit card with NFC capability, and the like. The agent may access an encrypted compressed file associated with the user, decrypt the file with the user's credentials (which may be stored in secure memory such as a TPM), and restore them to their appropriate folders in the file system (e.g., temporary internet folders, cookies folder, history folder, and the like). The user may then log into various websites automatically (or non-automatically in other embodiments). When the agent program no longer detects the presence of a device associated with the user, the agent may cause the system to automatically logout (e.g., bringing up a login screen). When another user is detected/logs in, previous user cookies, temporary files, and history may be re-archived and re-encrypted in a compressed file, and open web pages may be automatically closed. The new user's files may then be restored.

In an embodiment, upon loading a new user profile a system such as main compute node 180 may prompt a user for a password, a finger print reading, and/or any of various biometrics such as face/voice recognition to add security to a login sequence.

In one embodiment a process for conflict resolution may be implemented. For example, if main compute node 180 detects ID1 120 and ID2 170 are both within range 185 main compute node may prompt first user 105 to login while ensuring second user 155 is logged out. In another embodiment, if main compute node 180 detects ID1 120 and ID2 170 are both within range 185 main compute node 180 may shorten range 185 by, for example, 25%, 50%, or 75% to better assess which user of users 105, 155 is truly closest to main compute node 180, and likely the intended user of main compute node 180. For example, after the range is shortened node 180 may again check for which nodes, if any, are within the shortened range. Upon rechecking at a shorter range, node 180 may determine only one of users 105 and 155 is very close to node 180 and then decide to load the profile for the closest user.

Further, in one embodiment block 230 does not occur unless block 225 occurs. Thus, without main compute node 180 first detecting ID2 170 main compute node 180 will not load second profile 165 (and cookie2 107 associated with second profile 165). Thus, a malicious third party attempting to access second profile 165 from a remote location (e.g., via the internet) would be frustrated because the third party has no physical proximity to reader 121.

In one embodiment, a user profile may be shared. For example, both ID1 120 and ID2 170 may both correspond to profile 115. Thus, first user 105 and second user 155 may share profile 115. This may be convenient for a couple that wishes to use a common credit card or a common airline mileage account. Either user 105 or user 155 may cause a profile 115 to load. In one embodiment, detection of ID1 120 may cause node 180 to load multiple profiles. One profile may include profile 115, which may include first user 105's cookies for web sites A, B, and C. However, another profile (profile X) may also be loaded when profile 115 is loaded. Profile X may be shared with user 155 and may include cookies for web sites D and E. Thus, if user 105 visits website A his cookie or cookies from profile 115 are utilized but if he visits website D (e.g., a website for a program that users 105 and 155 wish to share to better accumulate purchase based rewards) the cookie or cookies from profile X are utilized.

Thus, various embodiments address the compute continuum of users moving fluidly moving among compute nodes and potential security issues related to the continuum.

In an embodiment, a method comprises a main compute node loading a first profile corresponding to a first compute node and a first user; detecting a second user identifier, corresponding to a second compute node, is located within a physical range of the main compute node; and loading a second profile associated with the second user based on detecting the second user identifier is located within the physical range of the main compute node.

An embodiment may include the main compute node unloading the second profile based on one of (i) detecting the second user identifier is no longer located within the physical range of the main compute node, and (ii) detecting the first user identifier is located within the physical range of the main compute node.

An embodiment includes the main compute node logging into a website based on a first cookie. This may occur automatically upon loading the cookie, automatically upon the user accessing the website in question, and the like. The embodiment may include logging off the website based on detecting the first user identifier is no longer located within the physical range of the main compute node.

An embodiment includes the main compute node receiving a second key from the second compute node 160 after detecting second user identifier ID2 170 is located within physical range 185 of main compute node 180. Main compute node 180 may decrypt encrypted second user profile 165, which is stored in main compute node 180 (but could be node 160 in another embodiment), based on the second key.

Figure 4:
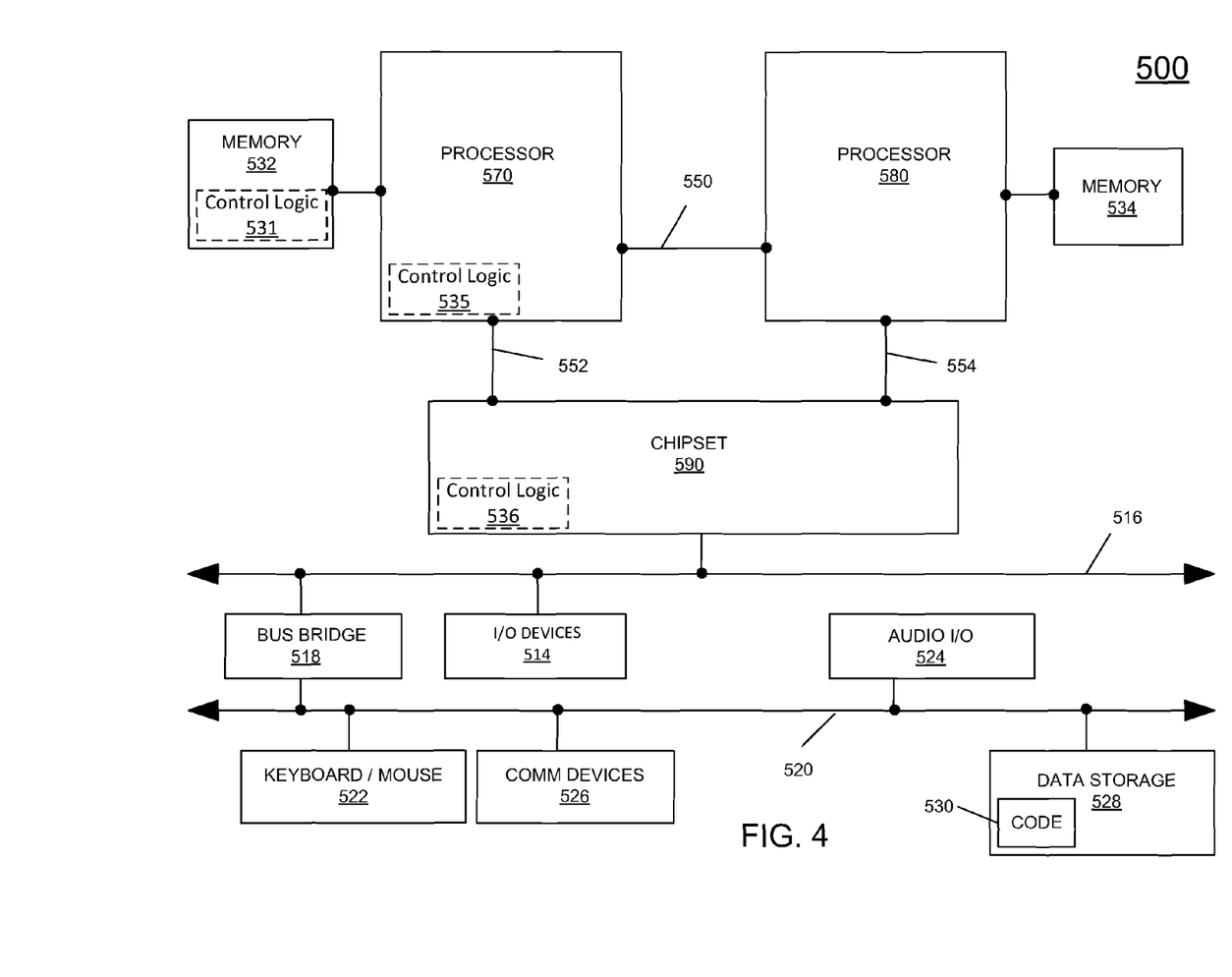
FIG. 4 includes a system for implementing embodiments of the invention.

Embodiments may be implemented in many different system types. Referring now to FIG. 4, shown is a block diagram of a system (e.g., node 1, node 2, and the like) in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Code may be included in one or more memories including memory 528, 532, 534, memory coupled to system 500 via a network, and the like. Further, an audio I/O 524 may be coupled to second bus 520.

Embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices (535). However, in another embodiment, logic also includes software or code (531). Such logic may be integrated with hardware, such as firmware or micro-code (536). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

All optional features of apparatus(s) described above may also be implemented with respect to method(s) or process(es) described herein. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    at least one processor; and
    control logic, coupled to a main compute node and the at least one processor, to:
        detect a first user identifier, corresponding to a first compute node, is located within a physical range of at least 0.25 meters from the main compute node;
        load a first profile corresponding to the first compute node and a first user based on detecting the first user identifier is located within the physical range;
        detect a second user identifier, corresponding to a second compute node, is located within the physical range;
        load a second profile corresponding to the second user based on detecting the second user identifier is located within the physical range; and
        after loading the first profile, detect the first user identifier is no longer located within the physical range and convey a communication that corresponds to the first user identifier no longer being located within the physical range;
        wherein loading the first profile includes loading a data container comprising state information corresponding to the first user, the state information comprising at least one member from the group consisting of billing information, a user interface setting, a security credential, and a place holder location corresponding to media previously consumed by the first user on a computing node other than the main computing node and the first computing node.

2. The apparatus of claim 1, wherein conveying the communication includes conveying the communication to at least one of the at least one processor and a computing node located remotely from the first compute node and the main compute node.

3. The apparatus of claim 1, wherein the control logic is to decrypt the first and second user profiles based on at least one additional security credential.

4. The apparatus of claim 3, wherein:
    the state information corresponds to a previous interaction with an additional computing node located remotely from the first compute node and the main compute node;
    a compute continuum includes the additional computing node, the first compute node, and the main compute node.

5. The apparatus of claim 4, wherein the previous interaction occurred before loading the first profile.

6. The apparatus of claim 5, wherein the state information was previously located on the additional computing node before loading the first profile.

7. The apparatus of claim 3, wherein the control logic is to automatically log into an application, without immediate assistance from the first user, based on the state information and in response to loading the first profile.

8. The apparatus of claim 7, wherein the application comprises a web page hosted on a computing node located remotely from the first compute node and the main compute node.

9. The apparatus of claim 7, wherein the application is hosted on a computing node located remotely from the first compute node and the main compute node.

10. The apparatus of claim 1, wherein the main compute node includes the at least one processor and the control logic.

11. The apparatus of claim 1, wherein the control logic is to unload the first profile in response to conveying the communication.

12. At least one non-transitory machine-readable medium having stored thereon data, which if used by at least one machine, causes the at least one machine to perform operations comprising:
    load a first profile corresponding to a first compute node and a first user in response to a communication that a first user identifier, corresponding to the first compute node, is located within a physical range of at least 0.25 meters from the at least one machine;
    load a second profile corresponding to a second user in response to a communication that a second user identifier, corresponding to a second compute node, is located within the physical range; and
    after loading the first profile, convey a communication in response to a communication that the first user identifier is no longer located within the physical range;
    wherein loading the first profile includes loading a data container comprising state information corresponding to the first user.

13. The at least one non-transitory medium of claim 12, wherein conveying the communication includes conveying the communication to at least one of the at least one machine and a computing node located remotely from the at least one machine and the first compute node.

14. The at least one non-transitory medium of claim 12 comprising instructions to decrypt the first and second user profiles based on at least one security credential.

15. The at least one non-transitory medium of claim 12, wherein:
    the state information corresponds to a previous interaction with an additional computing node located remotely from the first compute node and the at least one machine; and
    a compute continuum includes the additional computing node, the first compute node, and the at least one machine.

16. The at least one non-transitory medium of claim 15, wherein the previous interaction occurred before loading the first profile.

17. The at least one non-transitory medium of claim 16 wherein the state information was previously located on the additional computing node before loading the first profile.

18. The at least one non-transitory medium of claim 12 comprising instructions to automatically log into an application, without immediate assistance from the first user, based on the state information and in response to loading the first profile.

19. The at least one non-transitory medium of claim 18, wherein the application is hosted on a computing node located remotely from the first compute node and the at least one machine.

20. The at least one non-transitory medium of claim 12 comprising instructions to unload the first profile in response to conveying the communication.

\* \* \* \* \*